(12) United States Patent
Thurston et al.

(10) Patent No.: US 6,520,321 B2
(45) Date of Patent: Feb. 18, 2003

(54) MODULAR CONVEYOR

(76) Inventors: Donald S. Thurston, 22116 86A Avenue, Langley, British Columbia (CA), V1M 3S8; Gary M. Cardno, 22091 86A Avenue, Langley, British Columbia (CA), V1M 3S8

( * ) Notice: Subject to any disclaimer, the term of this patent is extended or adjusted under 35 U.S.C. 154(b) by 0 days.

(21) Appl. No.: 09/852,617

(22) Filed: May 11, 2001

(65) Prior Publication Data

US 2001/0040087 A1 Nov. 15, 2001

(51) Int. Cl.⁷ .............................................. B65G 23/44
(52) U.S. Cl. ................................ 198/813; 198/861.2
(58) Field of Search ................................ 198/813, 816, 198/860.2, 861.2, 842

(56) References Cited

U.S. PATENT DOCUMENTS

| | | | |
|---|---|---|---|
| 2,373,839 A | * | 4/1945 | Madeira ................. 198/861.2 |
| 2,523,829 A | * | 9/1950 | Hubbell .................... 198/816 |
| 2,897,955 A | * | 4/1959 | Morrow .................... 198/816 |
| 3,751,122 A | * | 8/1973 | Dubay ...................... 198/816 |
| 3,944,054 A | | 3/1976 | Ensinger |
| 4,650,067 A | | 3/1987 | Brule |
| 4,881,633 A | * | 11/1989 | Cailey et al. ............ 198/860.2 |
| 5,096,045 A | | 3/1992 | Feldl |
| 5,131,531 A | | 7/1992 | Chambers |
| 5,205,400 A | * | 4/1993 | Breuss et al. ............... 198/816 |

* cited by examiner

Primary Examiner—Joseph E. Valenza
(74) Attorney, Agent, or Firm—Hall, Priddy, Myers & Vande Sande

(57) ABSTRACT

The invention disclosed consists of a modular conveyor formed by a number of removably attachable conveyor sections, which form an elongated, endless conveyor. Each section contains a frame, a guide roller, and a plurality of legs. A drive roller is attached adjacent to the conveyor section located at one end of the elongated endless conveyor and an end roller is attached adjacent to the conveyor section at the opposite end of the elongated endless conveyor. An endless conveyor belt is mounted over the frames, the drive roller, and the end roller. The endless conveyor belt is further supported by the guide rollers. A drive motor is connected to the drive roller to provide motive power to drive the conveyor belt.

14 Claims, 3 Drawing Sheets

MODULAR CONVEYOR

FIELD

The invention relates to a modular conveyor composed of a plurality of removably attachable conveyor sections.

BACKGROUND

Modular conveyors are desirable in industrial applications to allow for temporary deployment in areas where a permanently installed conveyor is not possible. Modular conveyors of this type should be portable and easily assembled in order to maximize efficiency. Other types of modular conveyors have also been designed to address the need for use of conveyors in sharply curved or inclined areas. These designs are highly complex and conveyors built to these designs have not had any significant portability.

U.S. Pat. No. 3,944,054 issued to Ensinger discloses a modular conveyor with a channel-shaped frame and removable legs to allow adjustment from a flat to an inclined conveyor. However, the Ensinger conveyor does not include any guide rollers to support the conveyor belt, thus preventing maintenance of adequate belt tension and rendering the design unsuitable for long conveyors.

U.S. Pat. No. 5,131,531 issued to Chambers discloses a modular conveyor comprised of a series of modular frames and attachments. The frame components are connected alternately with separate attachment components. The conveyor belt is guided by means of guide channels pre-formed in each component. Correct alignment of these guide channels during assembly is required for proper functioning. The resulting conveyor design requires numerous components and is not suited to operations where repeated disassembly and removal of the conveyor system is required.

Consequently, there is a need for a less complex conveyor system that can be quickly assembled and disassembled, for use in operations where permanent mounting of the conveyor system is not possible. There is also a need for a portable modular conveyor that allows for very long conveyor lengths in the hundreds of feet. Finally, there is a need for a modular conveyor that meets the previous requirements and, for maximum efficiency, can be assembled, disassembled and modified by a minimum number of people, preferably a single person.

It is an object of this invention to provide a modular conveyor that can be quickly assembled and disassembled.

It is a further object of this invention to provide a modular conveyor that is suitable for very long conveyor systems with belt lengths in the hundreds of feet.

It is a still further object of this invention to provide a modular conveyor that can be assembled, disassembled and modified by a minimum number of people, preferably a single person.

SUMMARY OF THE INVENTION

The invention disclosed consists of a modular conveyor formed by a number of removably attachable conveyor sections, which form an elongated, endless conveyor. Each section contains a frame, a guide roller, and a plurality of legs. A drive roller is attached adjacent to the conveyor section located at one end of the elongated endless conveyor and an end roller is attached adjacent to the conveyor section at the opposite end of the elongated endless conveyor. An endless conveyor belt is mounted over the frames, the drive roller, and the end roller. The endless conveyor belt is further supported by the guide rollers. A drive motor is connected to the drive roller to provide motive power to drive the conveyor belt.

The frames of the conveyor sections may have longitudinally extending walls to provide additional support and prevent material from leaving the conveyor surface. Preferably, the legs attached to the conveyor sections are longitudinally extensible to vary the lengths of the legs and allow the conveyor to be securely supported on uneven surfaces.

Preferably, there are two legs attached to each frame, located at one end of each conveyor section, with one leg on either side of the frame.

Advantageously, individual conveyor sections may be removably attachable by elongated rods which couple to the corresponding elongated rods on the adjacent sections.

Preferably, the end roller is mounted on an adjustable frame so that the end roller position can be adjusted to maintain tension in the conveyor belt for proper operation. A removable platform may be removably attached to the adjustable frame to provide an area for loading and unloading material from the modular conveyor.

BRIEF DESCRIPTION OF THE DRAWINGS

Further features and advantages will be apparent from the following detailed description, given by way of example, of a preferred embodiment taken in conjunction with the accompanying drawings, wherein.

DETAILED DESCRIPTION OF THE INVENTION

Figure 1:
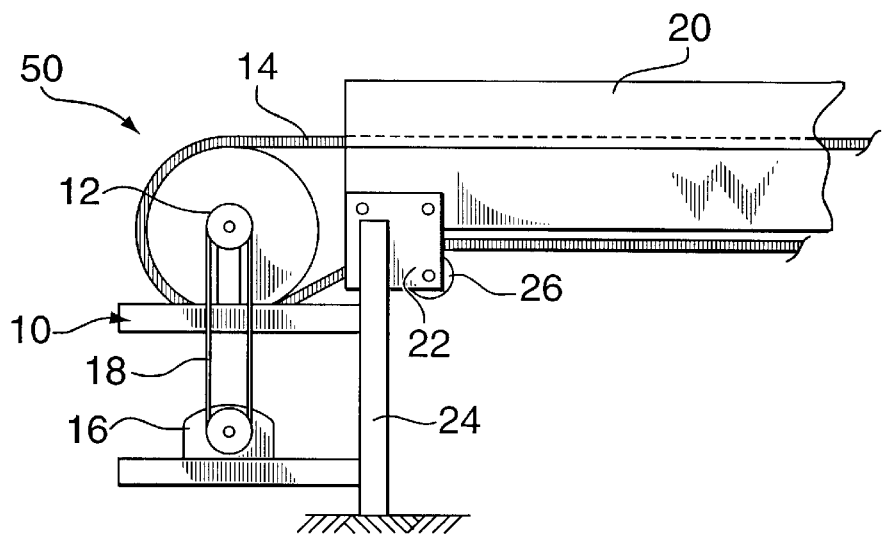
FIG. 1 is a side view of a drive motor and attached conveyor section.

Referring to FIG. 1, one end of the modular conveyor 50 comprises a drive motor section 10 with a drive roller 12 that rotates to drive an endless conveyor belt 14. A hydraulic motor 16 and drive chain 18 act as the drive motor, but any means to power rotation of the drive roller 12 may be used. The drive motor section 10 is attached to a conveyor section 20, with a frame 22 and guide roller 26 to support and guide the endless conveyor belt 14. The conveyor section 20 is supported by support legs 24 attached to frame 22. The endless conveyor belt 14 is a solid fabric or plastic web resistant to the frictional effects of the frame 22 and guide roller 26 such as, for example, polypropylene.

While the hydraulic motor 16 is shown beneath the drive roller 12, any location is possible. For example, the hydraulic motor 16 can be located beneath the frame 22, to reduce the potential for damage caused by material falling off the endless conveyor belt 14. Additionally, a cover (not shown) should be placed over the drive chain 18 to reduce the possibility of loose material or clothing being caught in the drive chain 18 or hydraulic motor 16.

By positioning the guide roller 26 as close to the end of the conveyor section 20 as possible, the distance the endless conveyor belt 14 travels from the end of the conveyor section 20 to the drive roller 12 is minimized. This positioning allows for a greater area of the endless conveyor belt 14 to be gripped by the drive roller 12. A greater gripping area increases the ability of the drive roller 12 to push or pull the endless conveyor belt 14 as required.

Furthermore, the guide roller 26 allows for the diameter of the drive roller 12 to be greatly increased in proportion to the separation distance of two sides of the endless conveyor belt 14. By making the drive roller 12 of a sufficiently large size, the modular conveyor 50 can be used in either a push or a pull fashion, eliminating the need to change the end at which the drive motor section 10 is mounted in order to change the direction of motion of the endless conveyor belt 14.

Figure 2:
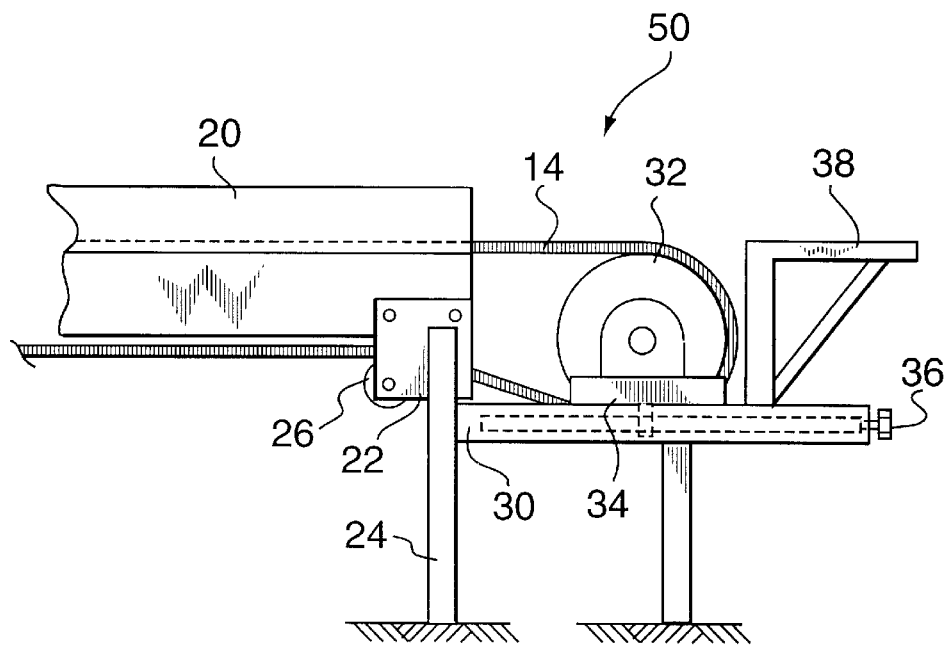
FIG. 2 is a side view of an end roller and attached conveyor section.

Referring to FIG. 2, the opposite end of the modular conveyor 50 comprises an end roller 32 secured to a support platform 30. The end roller 32 is attached to a slidable frame 34 secured to the support platform 30, allowing the tension in endless conveyor belt 14 to be maintained by moving slidable frame 34 longitudinally via threaded fastener 36.

There may also be a removable platform 38 attached to the slidable frame 34 adjacent to the end roller 32. The removable platform 38 allows for material to be stored for loading or unloading from the modular conveyor 50. The removable platform 38 can also be removed from the slidable frame 34 to provide access to the end roller 32 for maintenance. By attaching removable platform 38 to the slidable frame 34 instead of the support platform 30, the removable platform 38 will move together with the end roller 32 when tension is adjusted in the endless conveyor belt 14 by movement of the slidable frame 34. The removable platform 38 should be as close to the end roller 32 as possible to eliminate any gaps that could catch loose material or the clothing of operating personnel.

Figure 3:
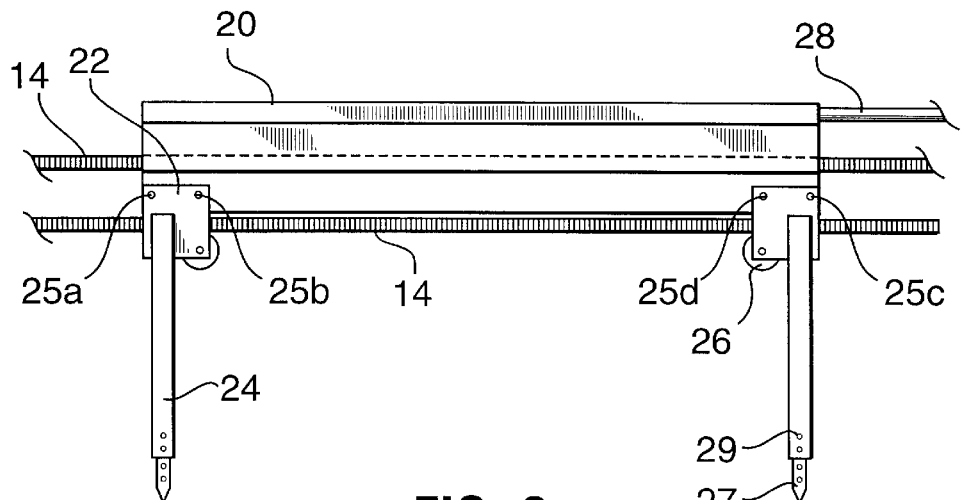
FIG. 3 is a side view of an unattached conveyor section.
Figure 4:
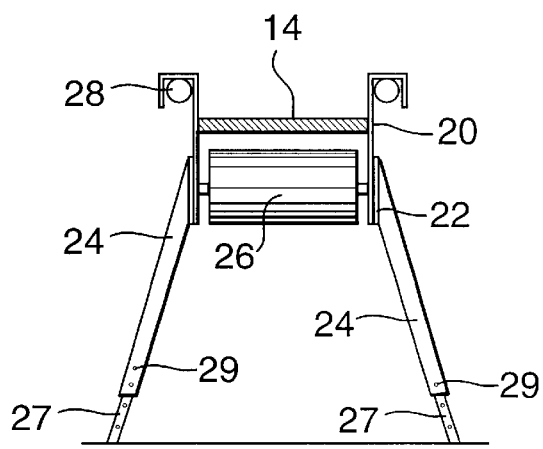
FIG. 4 is an end view of an unattached conveyor section.

Referring to FIG. 3 and FIG. 4, an individual conveyor section 20 includes attached support legs 24. The support legs 24 are attached to the frame 22 by a series of bolts 25a–d. Elongated rods 28 are used to form a connection between two conveyor sections 20. The conveyor belt 14 is supported by the frame 22 and guide roller 26 attached beneath the frame 22. Telescoping leg extensions 27 and adjustment pins 29 permit extension of the support legs 24.

While adjustment pins 29 are shown on the sides of support legs 24 in FIG. 4, for some applications it may be desirable to locate adjustment pins 29 on the interior of support legs 24. By locating adjustment pins 29 on the interior of support legs 24, inadvertent contact with persons working in the vicinity of the modular conveyor 50 (see FIG. 6) is prevented. Alternatively, the adjustment pins 29 can be replaced by making telescoping leg extensions 27 screw-threaded (not shown), allowing for more precise control of the total length of support legs 24.

By using elongated rods 28 to connect the conveyor sections 20, the process of adding or removing conveyor sections 20 from a modular conveyor 50 (see FIG. 6) is greatly simplified. The process is further simplified by forming endless conveyor belt 14 from pieces that are substantially double the length of a conveyor section 20. The pieces are connected to each other using known methods, such as end lacing, with a pin for easy removal of the lacing and separation of the belt pieces. Preferably, the belt pieces are custom-designed and cut for an optimal fit to the conveyor sections 20.

Therefore, when a conveyor section 20 is added or removed, a corresponding piece of endless conveyor belt 14 is also added or removed. The effect is that the number of people required to assemble, disassemble and modify the modular conveyor 50 is greatly reduced. It is expected that a modular conveyor 50 using 10-foot long conveyor sections 20 and 20-foot long pieces of endless conveyor belt 14 can be assembled, disassembled and modified by only one person with a reasonable amount of time and effort.

Figure 5:
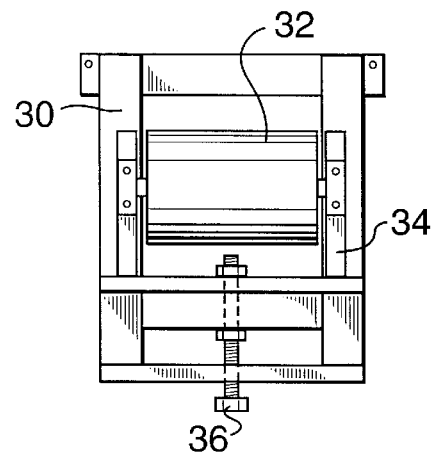
FIG. 5 is a top view of a slidable end roller frame.

Referring to FIG. 5, end roller 32 is connected to slidable frame 34 with threaded fastener 36 providing for adjustment and attachment to the supporting platform 30. The removable platform 38 (see FIG. 2) is not shown in order to provide a clear view of the adjustment mechanism.

Figure 6:
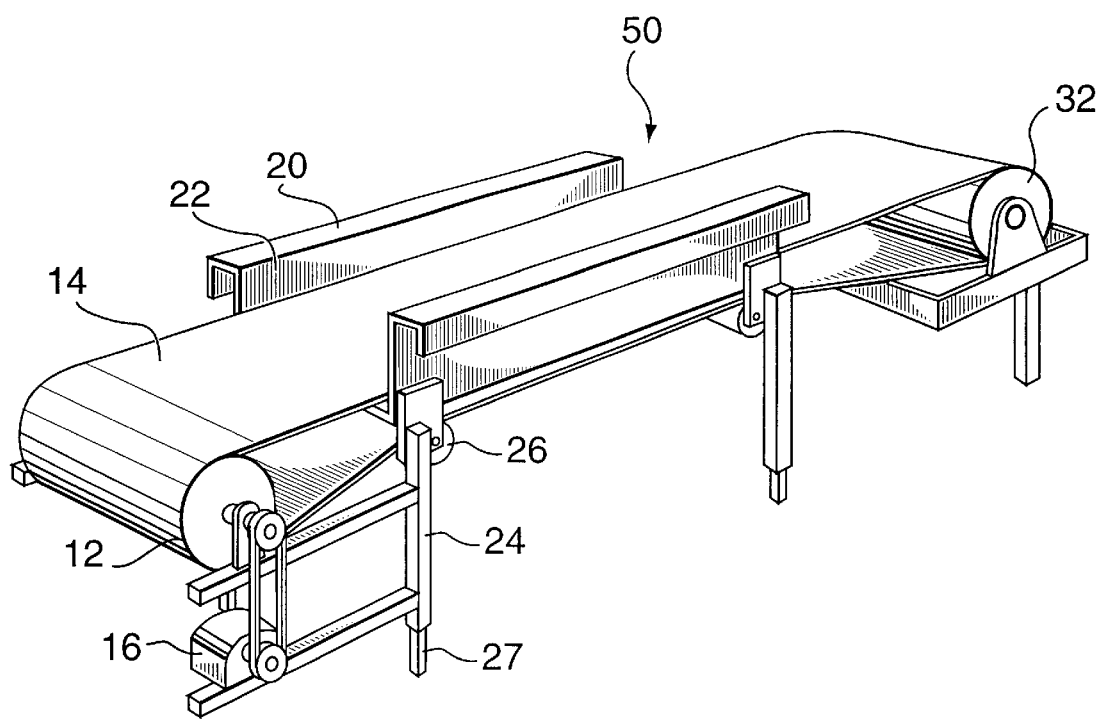
FIG. 6 is a perspective view of a modular conveyor.

Referring to FIG. 6, a fully assembled modular conveyor 50 is composed of a plurality of conveyor sections 20, a hydraulic motor 16 connected to drive roller 12 at one end, and an end roller 32 at the opposite end. Endless conveyor belt 14 is passed over drive roller 12 and end roller 32. Endless conveyor belt 14 is supported for the length of the modular conveyor 50 by the frames 22 and guide rollers 26. Support legs 24 attached to frames 22 support the modular conveyor 50. Telescoping leg extensions 27 permit extension of the support legs 24 to allow for proper support of the modular conveyor 50 on uneven surfaces. Telescoping leg extensions 27 may be screw-threaded, to permit precise control of the length of the support legs 24.

A potential method of application for the portable modular conveyor is in lime production operations. Removal of lime residue from the burner for such a process requires the burner to be shut down so that workers with picks, shovels and wheelbarrows can remove the residue. By using a modular conveyor as disclosed to replace the wheelbarrow chain, the removal can proceed in a more efficient manner. The individual legs 24 allow setting up the modular conveyor 50 on an uneven base such as the rounded floor of a burner. The construction of the burner prevents a permanent conveyor system from being implemented, therefore repeated assembly and disassembly of the conveyor is required.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A modular conveyor section, comprising:
    (a) a frame;
    (b) a plurality of legs affixed to said frame and operative to support said frame from a base;
    (c) a drive roller mounted proximate one end of said frame;
    (d) a drive motor mounted proximate said one end and coupled to said drive roller, operative to rotationally drive said drive motor;
    (e) an end roller rotationally mounted to an end of said frame opposite said one end, said end roller attached to a slidably adjustable frame such that said end roller is positioned to maintain tension in said conveyor belt;
    (f) an endless belt extending over said drive roller and said end roller;
    (g) two guide rollers, one of said guide rollers mounted proximate said one end and one of said guide rollers mounted proximate said end opposite said one end of said frame and contacting said endless belt so as to tension said belt and increase its frictional contact with said drive roller; and (h) a removable platform, removably attached to said slidable frame adjacent to said end roller.

2. The modular conveyor section according to claim 1, wherein said frame includes a pair of spaced apart, elongated walls extending proximate to a corresponding side edge of said conveyor belt.

3. The modular conveyor section according to claim 1, wherein each leg in said plurality of legs is extendable longitudinally so as to vary the length of said each leg.

4. The modular conveyor section according to claim 3, wherein the number of legs in said plurality of legs is four, with said four legs arranged in pairs, one leg on either side of said frame and said pairs attached at proximate ends of said conveyor section.

5. The modular conveyor section according to claim 3, wherein the number of legs in said plurality of legs is two, with one leg on either side of said frame and said legs attached proximate one end of said conveyor section.

6. The modular conveyor section according to claim 1, wherein said conveyor section includes a pair of elongated rods, at least one end of each of which is removably couplable to an end of an elongated rod of an adjacent conveyor section so as to align said conveyor section with said adjacent conveyor section.

7. A modular conveyor, comprising:
(a) a plurality of conveyor sections, each said conveyor section comprising:
(i) a frame;
(ii) a plurality of legs affixed to said frame and operative to support said frame from a base;
(iii) two guide rollers, one of said guide rollers mounted proximate said one end and one of said guide rollers mounted proximate said end opposite said one end of said frame;
(b) a drive roller mounted proximate to one end of said modular conveyor;
(c) a drive motor mounted proximate said one end and coupled to said drive roller, operative to rotationally drive said drive motor;
(d) an end roller rotationally mounted to an end of said modular conveyor opposite said one end;
(e) an endless belt extending over said drive roller and said end roller and contacting said guide rollers mounted on said frames so as to tension said belt and increase its frictional contact with said drive roller.

8. A modular conveyor according to claim 7, wherein each said frame includes a pair of spaced apart, elongated walls extending proximate to a corresponding side edge of said conveyor belt.

9. A modular conveyor according to claim 7, wherein each leg in each said plurality of legs is extendable longitudinally so as to vary the length of said each leg.

10. A modular conveyor according to claim 9, wherein the number of legs in each said plurality of legs is four, with said four legs arranged in pairs, one leg on either side of each said frame and said pairs attached at proximate ends of each said conveyor section.

11. A modular conveyor according to claim 9, wherein the number of legs in each said plurality of legs is two, with one leg on either side of each said frame and said legs attached proximate one end of each said conveyor section.

12. A modular conveyor according to claim 7, wherein each said conveyor section includes a pair of elongated rods, at least one end of each of which is removably couplable to an end of an elongated rod of an adjacent conveyor section so as to align said each conveyor section with said adjacent conveyor section.

13. A modular conveyor according to claim 7, wherein said end roller is attached to a slidably adjustable frame such that said end roller is positioned to maintain tension in said conveyor belt.

14. A modular conveyor according to claim 11, wherein a removable platform is removably attached to said slidable frame adjacent to said end roller.

* * * * *

UNITED STATES PATENT AND TRADEMARK OFFICE
CERTIFICATE OF CORRECTION

PATENT NO. : 6,520,321 B2
DATED : February 18, 2003
INVENTOR(S) : Thurston et al.

It is certified that error appears in the above-identified patent and that said Letters Patent is hereby corrected as shown below:

Column 6,
Line 35, delete "according to claim 11", and insert -- according to claim 13 --.

Signed and Sealed this

Twenty-second Day of June, 2004

JON W. DUDAS
*Acting Director of the United States Patent and Trademark Office*